US010899045B2

(12) United States Patent
Palmieri et al.

(10) Patent No.: US 10,899,045 B2
(45) Date of Patent: Jan. 26, 2021

(54) HIGH PRESSURE SOFT LITHOGRAPHY FOR MICRO-TOPOGRAPHICAL PATTERNING OF MOLDED POLYMERS AND COMPOSITES

(71) Applicant: U.S.A. as represented by the Administrator of the National Aeronautics and Space Administration, Washington, DC (US)

(72) Inventors: Frank L. Palmieri, Hampton, VA (US); Vincent B. Cruz, Hayes, VA (US); Christopher J. Wohl, Jr., Portsmouth, VA (US)

(73) Assignee: U.S.A. as represented by the Administrator of the National Aeronautics and Space Administration, Washington, DC (US)

( * ) Notice: Subject to any disclaimer, the term of this patent is extended or adjusted under 35 U.S.C. 154(b) by 16 days.

(21) Appl. No.: 14/206,457

(22) Filed: Mar. 12, 2014

(65) Prior Publication Data
US 2014/0262015 A1 Sep. 18, 2014

Related U.S. Application Data

(60) Provisional application No. 61/777,748, filed on Mar. 12, 2013.

(51) Int. Cl.
*B29C 33/38* (2006.01)
*B29C 33/30* (2006.01)
(Continued)

(52) U.S. Cl.
CPC ........ *B29C 33/3857* (2013.01); *B29C 33/302* (2013.01); *B29C 33/38* (2013.01);
(Continued)

(58) Field of Classification Search
CPC .......... B29C 2059/023; B29C 37/0053; B29C 2059/3655; B29C 2059/3657;
(Continued)

(56) References Cited

U.S. PATENT DOCUMENTS 3,061,880 A * 11/1962 Weisbach ............. A63H 33/001
249/104
3,431,601 A * 3/1969 Lipscomb ............... B22C 7/005
249/117
(Continued)

FOREIGN PATENT DOCUMENTS

DE 102011110206 A1 * 2/2013 ............. B29C 33/00
EP 2682257 A1 * 1/2014 ............. B29C 70/48
(Continued)

OTHER PUBLICATIONS

Machine translation of Japanese Patent Publication No. JP 01-178442 A, originally published Jul. 1989, 4 pages.*
(Continued)

*Primary Examiner* — Philip C Tucker
*Assistant Examiner* — Jimmy R Smith, Jr.
(74) *Attorney, Agent, or Firm* — Jennifer L. Riley; Robin W. Edwards; Helen M. Galus (57) ABSTRACT

A soft lithography template or stamp is made by casting a polydimethysiloxane (PDMS) or other suitable elastomeric precursor onto a master pattern. The master pattern may be formed utilizing known micro-fabrication techniques. The PDMS template includes an inverse copy of the microstructures on the master pattern, and can be placed into a mold used to prepare a carbon-fiber reinforced polymer composite part or other polymer molding systems where a matrix material passes through a fluid state during the cure process. The liquid resin material flows into the structures on the surface of the PDMS template and hardens during the
(Continued)

curing cycle. After the part is released from the mold, the PDMS template can be peeled from the surface of the part to reveal the free standing micro structures which are a replica of the master pattern.

20 Claims, 9 Drawing Sheets

(51) Int. Cl.
    *B29C 33/42*     (2006.01)
    *B29C 33/40*     (2006.01)

(52) U.S. Cl.
    CPC .......... *B29C 33/405* (2013.01); *B29C 33/424* (2013.01); *B29K 2883/00* (2013.01)

(58) Field of Classification Search
    CPC ..... B29C 70/342; B29C 70/44; B29C 33/306; B29C 33/302; B29C 33/424; B29C 33/14; B29C 33/18; B29C 33/50; B29C 2043/3652; B29C 2043/3665; B29C 33/38; B29C 33/3857; B29C 33/405
    See application file for complete search history.

(56) References Cited

U.S. PATENT DOCUMENTS

| | | | | |
|---|---|---|---|---|
| 4,907,765 | A * | 3/1990 | Hirschel | B64C 21/10 244/130 |
| 7,758,786 | B2 | 7/2010 | Nemchick | B29C 33/424 264/236 |
| 9,238,309 | B2 * | 1/2016 | King | B29C 33/3857 |
| 2012/0023727 | A1 * | 2/2012 | Meyer | B29C 33/306 29/428 |
| 2012/0126458 | A1 * | 5/2012 | King | B22C 9/00 264/483 |
| 2013/0062004 | A1 * | 3/2013 | Amirehteshami | B29C 70/78 156/245 |
| 2014/0008009 | A1 * | 1/2014 | Sana | B29C 70/32 156/213 |
| 2015/0072110 | A1 * | 3/2015 | Sitti | B29C 37/0053 428/156 |

FOREIGN PATENT DOCUMENTS

JP           01178442 A  *  7/1989
WO     WO-2012090468 A1  *  7/2012  ............. B29C 70/32

OTHER PUBLICATIONS

Peters, S.T., Composites Handbook, Second Edition, 1998, pp. 352-377.*
Machine translation of European Patent Publication No. EP-22682257A1, originally published Jan. 8, 2014, 12 pages (Year: 2014).*
Machine translation of German Patent Publication No. DE-102011110206A1, originally published Feb. 21, 2013 (Year: 2013).*
Ryosuke Matsuzaki and Takuya Suzuki, "Surfaced Modification by Nanoimprint Lithography for Improvement of the Joint Strength of Composites," Journal of Solid Mechanics and Materials Engineering, vol. 4, No. 7, 2010, pp. 963-973, 2010.
B.M. Parker and R.M. Waghorne, "Surface Pretreatment of Carbon Fibre-Reinforced Composites for Adhesive Bonding," Composites, Jul. 1982, pp. 280-288.
Lian Duan and Meelan M. Choudhari, "Effects of Riblets on Skin Friction and Heat Transfer in High-Speed Turbulent Boundary Layers," 50th AIAA Aerospace Sciences Meeting including the New Horizons Forum and Aerospace Exposition, Jan. 9-12, 2012, Nashville, TN, pp. 1-17.
Michael J. Walsh, "Riblets as a Viscous Drag Reduction Technique," AIAA Journal, vol. 21, No. 4, Apr. 1983.
Jens H.M. Fransson, Alessandro Talamilli, Luca Brandt, and Carlo Cossu, "Delaying Transition to Turbulence by a Passive Mechanism," Physical Review Letter, 96, 064501, (2006).

* cited by examiner

HIGH PRESSURE SOFT LITHOGRAPHY FOR MICRO-TOPOGRAPHICAL PATTERNING OF MOLDED POLYMERS AND COMPOSITES

CROSS-REFERENCE TO RELATED PATENT APPLICATION(S)

This patent application claims the benefit of and priority to U.S. Provisional Patent Application No. 61/777,748, filed on Mar. 12, 2013, the contents of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Known soft lithography techniques utilize a soft polymeric mold or template made from a material such as polydimethylsiloxane (PDMS). The mold is cast using a master that comprises a hard material. The master is fabricated using photolithography, e-beam, micro-machining or other suitable process. The mold or template is an exact structural inverse of the master surface. The molds can be used to transfer the master pattern to various surfaces.

Various types of micro-topographical surface patterns or features have been developed. A known type of surface includes moderate to high aspect ratio micro-structures that allow for reduced interactions of particles and fluids with the surface. A reduced contact area reduces the energy that would otherwise be required to remove contamination from the surface. In the case of superhydrophobic surfaces, fluids are suspended over air that is trapped between micro-structures on the surface in a Cassie-Baxter state. Abhesive and superhydrophobic surfaces help protect a part from contamination and fouling.

Various types of micro surface structures have also been developed to reduce drag in aerodynamic and hydrodynamic applications. An example of a naturally-occurring drag reducing surface structure can be found on the skin of a shark, which helps the sharks swim more efficiently.

Other surfaces have been developed to improve adhesion between two parts in an adhesively bonded joints. Surface roughness may be created by mechanical abrasion such as sand blasting or sanding. However, such techniques may not provide the desired degree of control of the surface roughness, and may introduce contamination into the material that can be difficult to remove. Furthermore, if a composite material is blasted or sanded, removal of the matrix resin from the surface may expose the reinforcing fibers, which creates a point of ingress for degenerative environmental components such as water and oxygen.

BRIEF SUMMARY OF THE INVENTION

One aspect of the present invention is a method of forming a surface in a composite material having at least a curable matrix and a fiber reinforcement. The method includes forming a flexible template having a template surface that has at least a plurality of surface features. The surface features can be inverses of micro-structures to be formed in the surface of an object. The object can be any physical or tangible thing, such as for example, a part, a component, a piece, a portion, a segment, a section, a fragment, a tool, a die, a sheet, a patch, a layer, and/or a design, and so on. In some embodiments, the inverses of micro-structures can have a specifically defined shape that can be uniform or non-uniform. In some embodiments, the inverses of micro-structures can cover any portion of the template surface or, in the alternative, the entire template surface.

The flexible template is positioned in a mold tool such that it conforms to the surface of the mold. In some embodiments, the mold tool has a non-planar surface. In an embodiment, the flexible template is positioned in a mold tool having a curved surface, and the flexible template flexes to conform to the curved surface of the mold. In some embodiments, the flexible template flexes by bending, moving, deforming, distorting, and/or changing shape. Next, at least a portion of the template surface is covered with a composite. The composite includes at least a matrix material and a fiber reinforcement. When the composite material is applied to the flexible template, the matrix material is in a flowable, malleable, and/or deformable state. Pressure is applied to the composite material while the matrix material is in a flowable, malleable, or deformable state to cause at least some of the matrix material to enter and/or flow into the surface features of the template surface. The matrix material is solidified to form a composite object having an object surface defining micro-structures that are inverses of the surface features of the template surface. Solidifying the matrix material includes hardening, becoming a solid form, and curing. Once the matrix material is in a solid or cured form, the object formed from the composite material is disengaged from the flexible template to expose the object surface.

Another aspect of the present invention is a method of forming a surface having at least a plurality of predefined microscopic features. The method includes forming a flexible template having a plurality of microscopic cavities on the template surface. The flexible template is flexed or deformed by positioning the flexible template in contact with a non-planar surface. The method includes causing a material, such as a polymer or polymer composite, to flow into at least a portion of the cavities while the flexible template is in contact with the non-planar surface. The material can be solidified or cured while it is in contact with the non-planar surface. The material is disengaged from the template to reveal a surface having at least a plurality of protrusions formed by the cavities. The material may be in a liquid or flowable state at the time it enters at least a portion of the cavities, and the material may be cured prior to disengaging the material from the template. The material may comprise at least a polymer material forming a matrix of a fiber reinforced composite material that is cured utilizing heat. The flexible template may be formed from an elastomeric material that is brought into contact with a master surface while the elastomeric material is in a liquid or flowable form, and curing the elastomeric material while it is in contact with the master surface. The master surface may be formed utilizing an etching process. The non-planar surface may comprise a curved mold surface that is positioned in a curing device, a pressure and/or temperature vessel, or the like. Examples of devices/vessels into which the curved mold can be placed include an autoclave, a heated press, a heated vacuum press, or the like. Any suitable means of applying a load to the mold to achieve the desired results can be used. In some embodiments, the load applied to the mold is pressure. In some embodiments, heat is applied to the mold in addition to the load.

These and other features, advantages, and objects of the present invention will be further understood and appreciated by those skilled in the art by reference to the following specification, claims, and appended drawings.

DETAILED DESCRIPTION OF THE INVENTION

Figure 1:
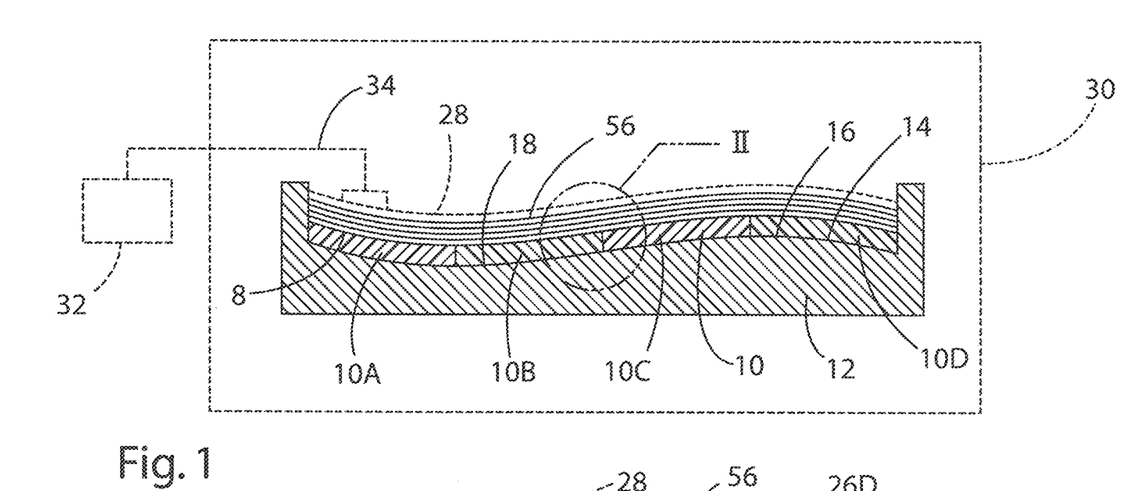
FIG. 1 is a partially schematic cross sectional view of a composite part positioned in a mold in an autoclave.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
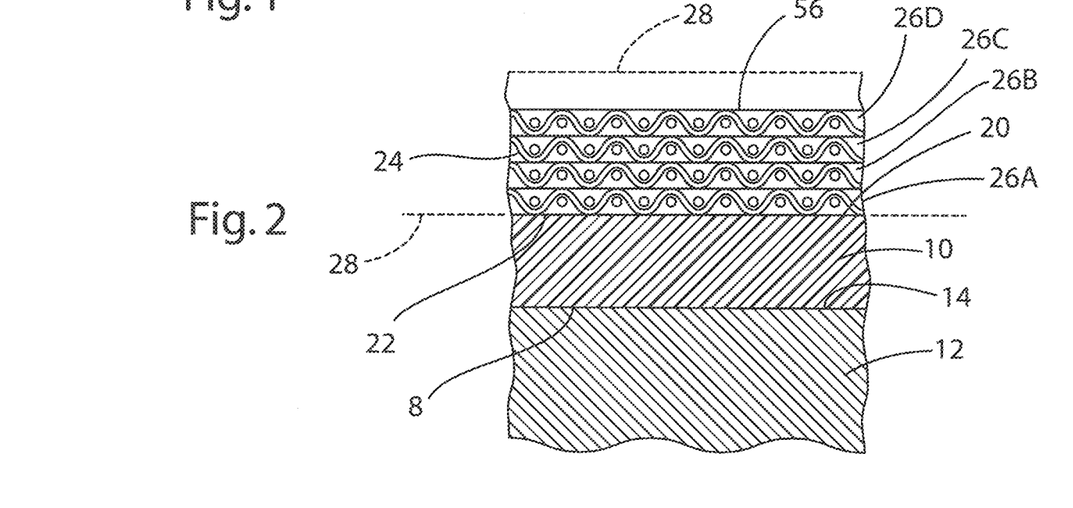
FIG. 2 is a fragmentary, enlarged view of a portion of the composite part and mold of FIG. 1.

With reference to FIGS. 1 and 2, the present invention involves forming a flexible template 10 that may be positioned on or in a mold tool 12 having a mold surface 14. The mold surface 14 may include a convexly curved portion 16 and/or a portion 18 having a concave curvature. It will be understood that the mold surface 14 may also comprise a more complex curvature such as a "saddle surface" (e.g. a hyperbolic paraboloid). The template 10 is preferably made of a flexible material such as a cast polydimethylsiloxane (PDMS) or other suitable elastomeric material. As discussed in more detail below, a surface 20 of template 10 includes a plurality of micro-structures that are the inverse of micro-structures formed in a surface 22 of a part 24. The part 24 may comprise a composite material, such as a carbon fiber reinforced structure having a thermosetting polymer matrix.

Referring again to FIG. 1, the template 10 may comprise a one piece member, or it may comprise a plurality of pieces 10A-10D that are positioned directly adjacent one another on the mold surface 14. In the illustrated example, the part 24 is formed from a prepreg carbon fiber material. The layers 26A-26D of uncured prepreg material are laid on the mold surface 24 in the orientations required for a particular application. It will be understood that the number of layers 26 of the carbon fiber material utilized will vary depending upon the requirements of a particular application. In the illustrated example, the layers 26A-26D of composite part 24 are positioned inside an impermeable envelope 28, and the layers 26A-26D are subject to a vacuum resulting from vacuum pump or device 32 which is operably connected to the envelope 28 by a vacuum line 34. The mold tool 12 and part 24 (i.e. layers 26A-26D) may be positioned in an autoclave 30 to cure the matrix material of the layers 26. As known in the art, the autoclave 30 may be utilized to provide heat and pressure that cures a thermosetting polymer material forming the matrix of the layers 26A-26D. This forms a rigid composite part having a shape that generally conforms to the shape of the mold surface 14.

The present invention generally involves forming a master part 38 (FIGS. 3 and 4) having a master surface 40 having a plurality of surface features such as protrusions 42. A template 10 (FIGS. 5 and 6) is then cast from master part 38 utilizing an elastomeric material such as a PDMS material. The template 10 includes a surface 20 having a plurality of features such as openings or cavities 52 that are an inverse of the master surface 40 and surface features 42 of master part 38. A part 24 is then formed utilizing a high pressure and/or heat process such as the autoclave process described above in connection with FIGS. 1 and 2 to form a part 24 having a surface 22 (FIGS. 7 and 8) that may include a plurality of micro-structures such as protrusions 54.

Figure 7:
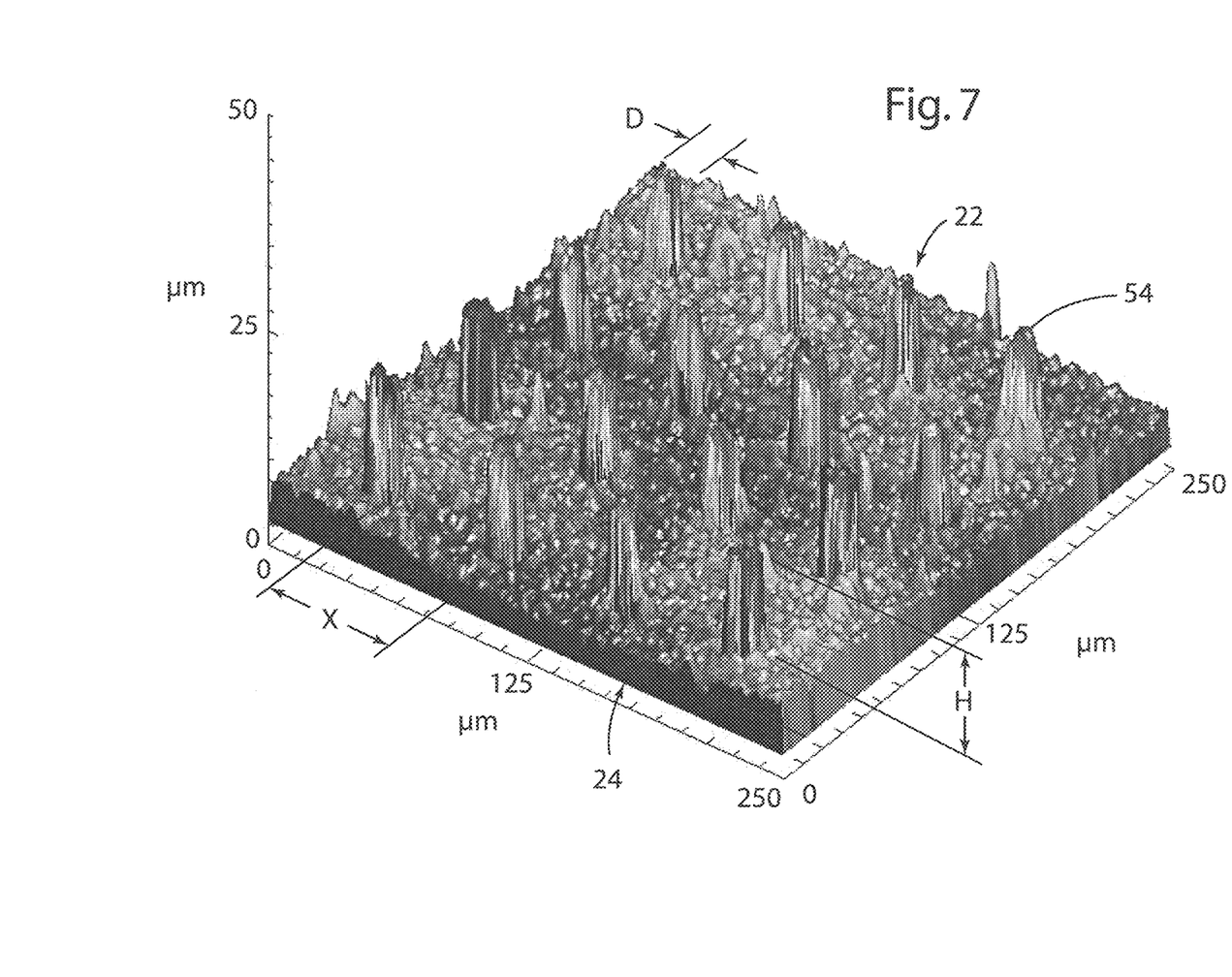
FIG. 7 is an isometric view of the surface of a part formed utilizing the flexible template of FIGS. 5 and 6, wherein the image is formed utilizing an interferometric microscope.
Figure 8:
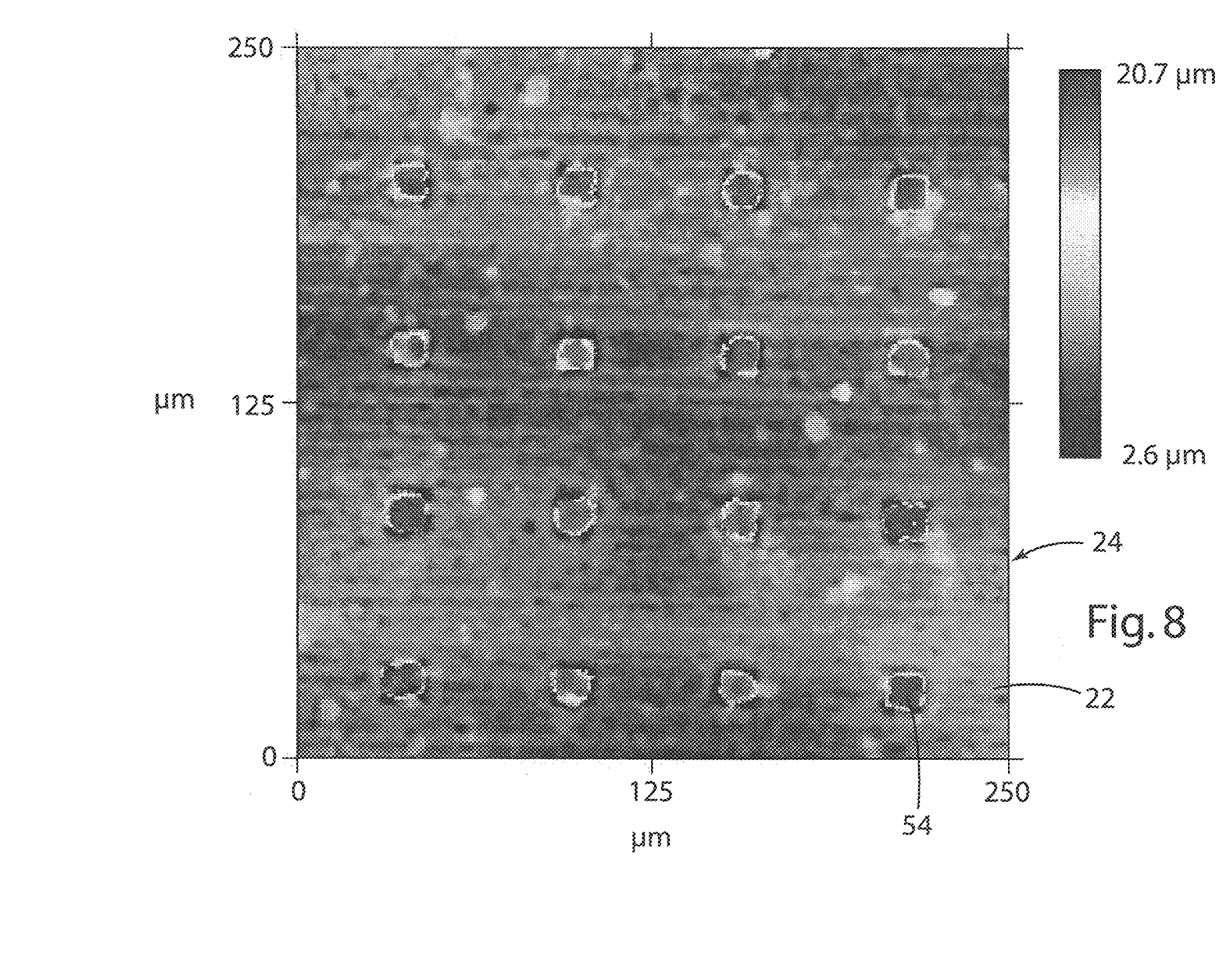
FIG. 8 is a plan view of the surface of FIG. 7.

Referring again to FIGS. 3 and 4, a master part 38 is first formed utilizing standard micro-fabrication techniques. In the illustrated example, the master part 38 is formed from a KAPTON® (polyimide) film having a master surface 40 including a plurality of surface features such as protrusions 42 that are formed using an etching process. However, the master part 38 may be fabricated from a wide range of materials utilizing various known processes. For example, the protrusions 42 and/or other surface features may be formed by a laser writing or electron beam writing process. The master part 38 may be formed from virtually any material having the required characteristics for a particular application. The master surface 40 is formed such that it includes a plurality of surface features corresponding to the surface features that are to be formed in the final part 24 (FIGS. 7 and 8). In the illustrated example, the protrusions 42 have a generally square cross-sectional shape with sides having a dimension "D" of about 20 microns. It will be understood that protrusions 42 or other such features may have a uniform cross-sectional shape and size, or the protrusions may have a non-uniform or tapered configuration whereby the bases of the protrusions 42 have a greater cross-section area than the end portions. Also, in the illustrated example, the protrusions 42 have a height "H" of about 20 microns. In the illustrated example, the protrusions 42 are equally and/or evenly spaced apart in a square grid pattern with spacing of "X" (center-to-center) spacing between protrusions 42 of about 60 microns.

Figure 3:
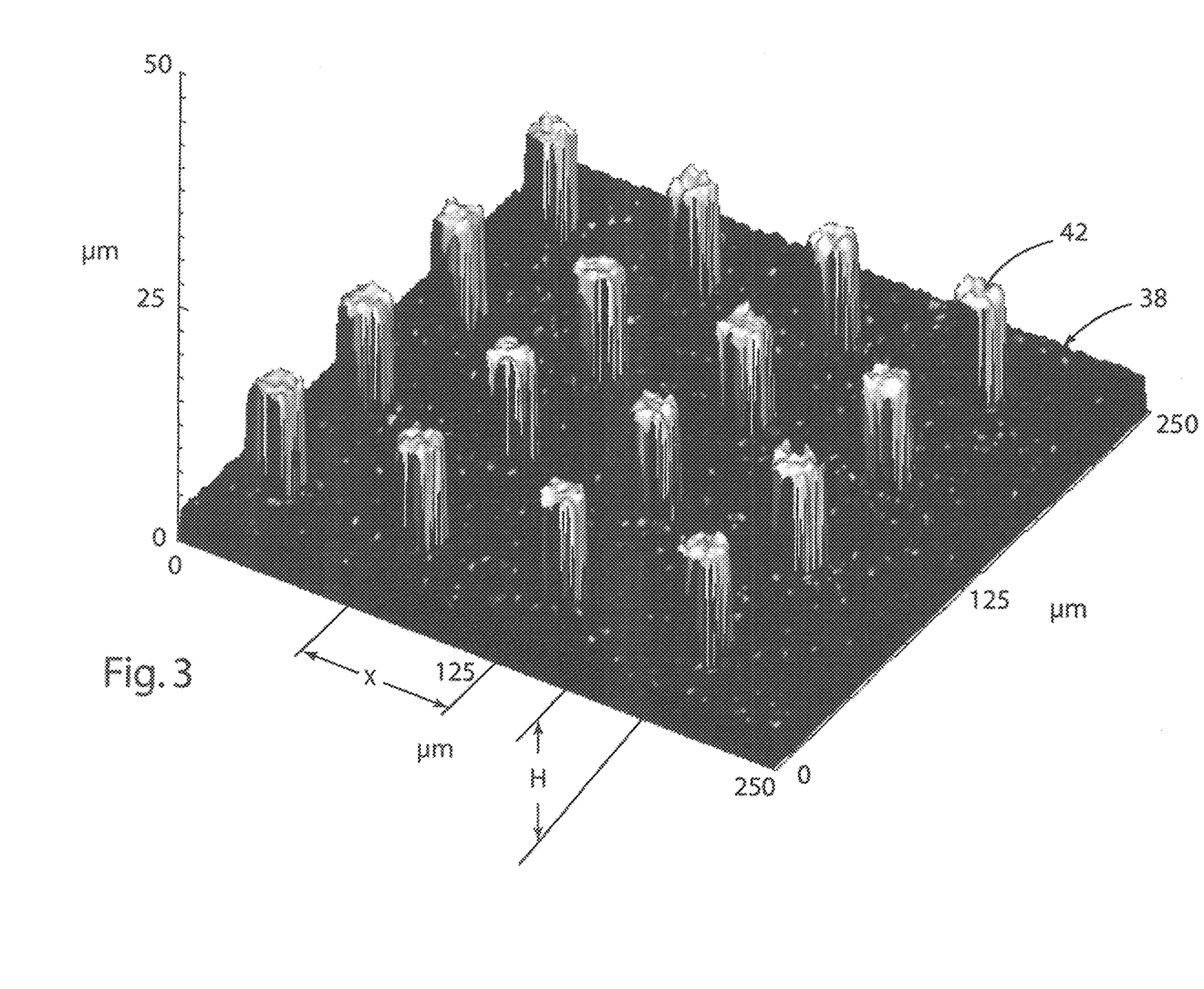
FIG. 3 is an isometric view of a master surface formed in a polyimide film, wherein the image was formed utilizing an optical profilometer.
Figure 4:
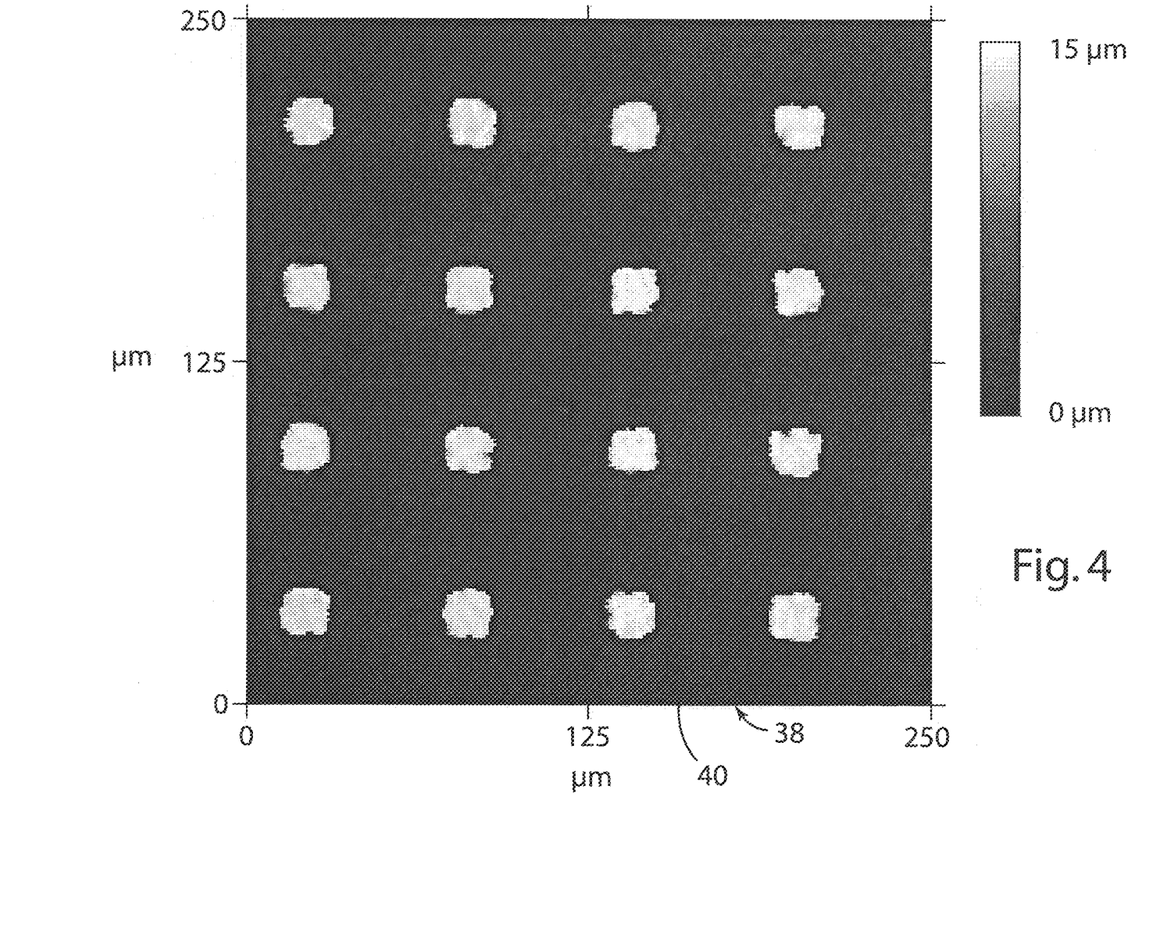
FIG. 4 is a plan view of the master surface of FIG. 3.

The master surface 40 is not limited to the arrangement shown in FIGS. 3 and 4, and the surface 22 of the final part 24 is not limited to the configuration of FIGS. 7 and 8. Rather, the master surface 40 and surface 22 may be configured as required to provide a particular surface property. For example, the surfaces 22 and 40 may comprise superhydrophobic surfaces having a moderate to high aspect ratio. The aspect ratio is the ratio of the height of the micro-structures (e.g. height "H" in FIG. 3) divided by the diameter or transverse dimension (e.g. "D" in FIG. 3). In general, moderate to high aspect ratio micro-structures (e.g. aspect ratios greater than about 1.0) allow for reduced interactions of particles and fluids with a surface. A reduced contact area reduces the energy needed to remove contamination from the surface. In the case of superhydrophobic surfaces, fluids may be suspended over air trapped between the micro-structures (e.g. protrusions 42) in a Cassie-Baxter state. Abhesive (non-stick) and superhydrophobic surfaces help protect a part from contamination and fouling. The surface 22 (FIGS. 7 and 8) of the part 24 may comprise an outer surface of a wing or other aerodynamic structure. The size, configuration, spacing, and other geometric features such as protrusions 54 may be utilized to form superhydrophobic surfaces that act to repel water, prevent water damage, and also prevent accumulation of foreign matter such as dirt, bug splatter, and ice on aircraft wings and other structures.

Still further, the protrusions 42-54 may be configured to reduce skin drag if surface 22 of part 24 comprises an aerodynamic surface (e.g. an outer wing surface) or a hydrodynamic surface (e.g. an outer surface of a boat hull or submarine). The protrusions 42/54 may comprise riblets, pyramids or other such structures (not shown) that reduce skin drag. Micro-structures of the type that reduce aerodynamic and/or hydrodynamic drag are generally known in the art. Examples of such structures are disclosed in "Effects of Riblets on Skin Friction and Heat Transfer in High-Speed Turbulent Boundary Layers," Lian Duan and Meelan M. Choudhari, 50$^{th}$ AIAA Aerospace Sciences Meeting including the New Horizons Forum and Aerospace Exposition, Jan. 9-12, 2012, Nashville, Tenn., "Riblets as a Viscous Drag Reduction Technique," Michael J. Walsh, AIAA Journal, Vol. 21, No. 4, April 1983 and "Delaying Transition to Turbulence by a Passive Mechanism" Jens H. M. Fransson, Alessandro Talamelli, Luca Brandt, and Carlo Cossu, PRL 96, 064501 (2006), the entire contents of each being incorporated herein by reference.

Furthermore, the master surface 40 of master part 38 (FIGS. 3 and 4) may be configured to produce a part surface 22 (FIGS. 7 and 8) having improved adhesion properties for an adhesive bonded joint. In general, an average surface roughness in the range of about 1.0 microns to about 2.0 microns provides significantly improved adhesion compared to a smooth surface. As used herein, the definition of surface roughness is the arithmetic average deviation of the average line profile. For purposes of providing improved adhesion, the master surface 40 and surface 22 of part 24 may have an average roughness in the range of about 100 nm to about 100 microns.

Figure 5:
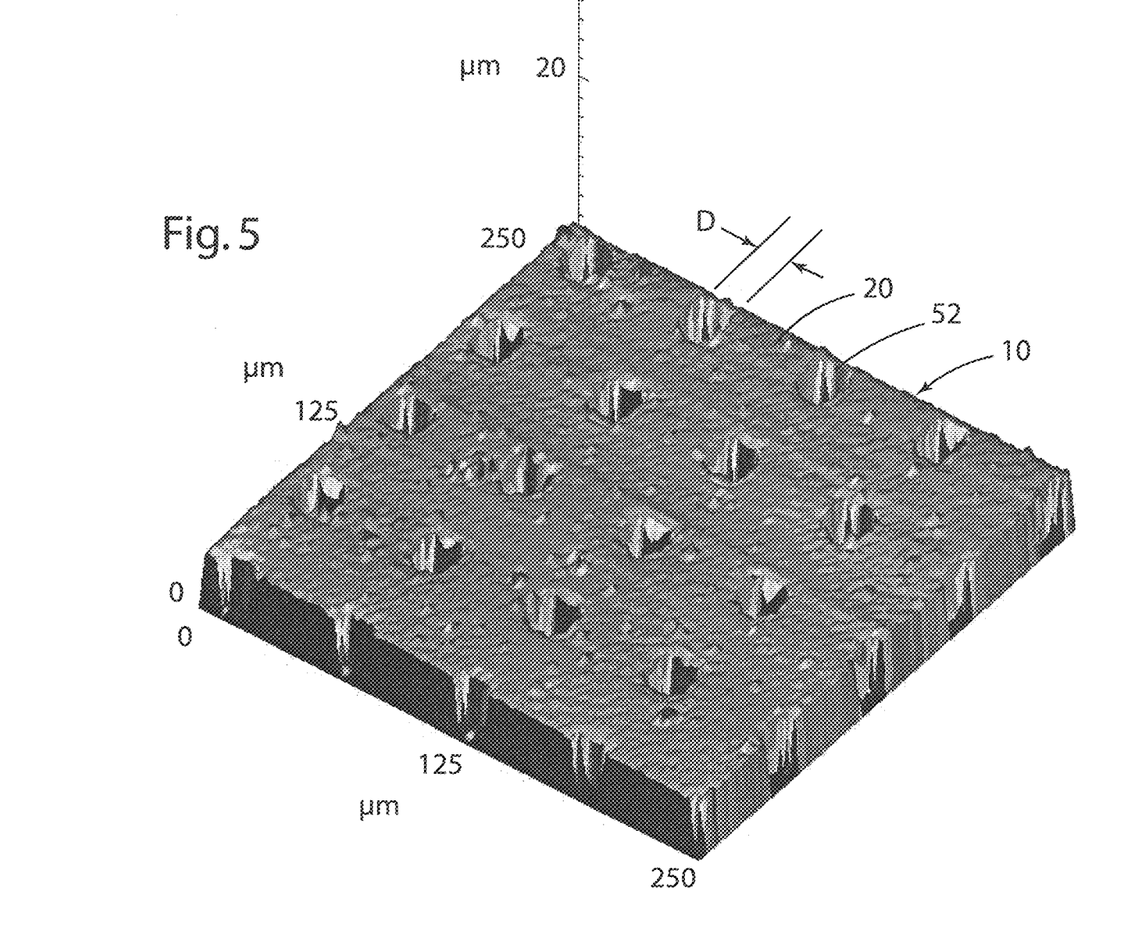
FIG. 5 is an isometric view of a flexible template formed from the master surface of FIGS. 3 and 4, wherein the image is formed utilizing an interferometric microscope.
Figure 6:
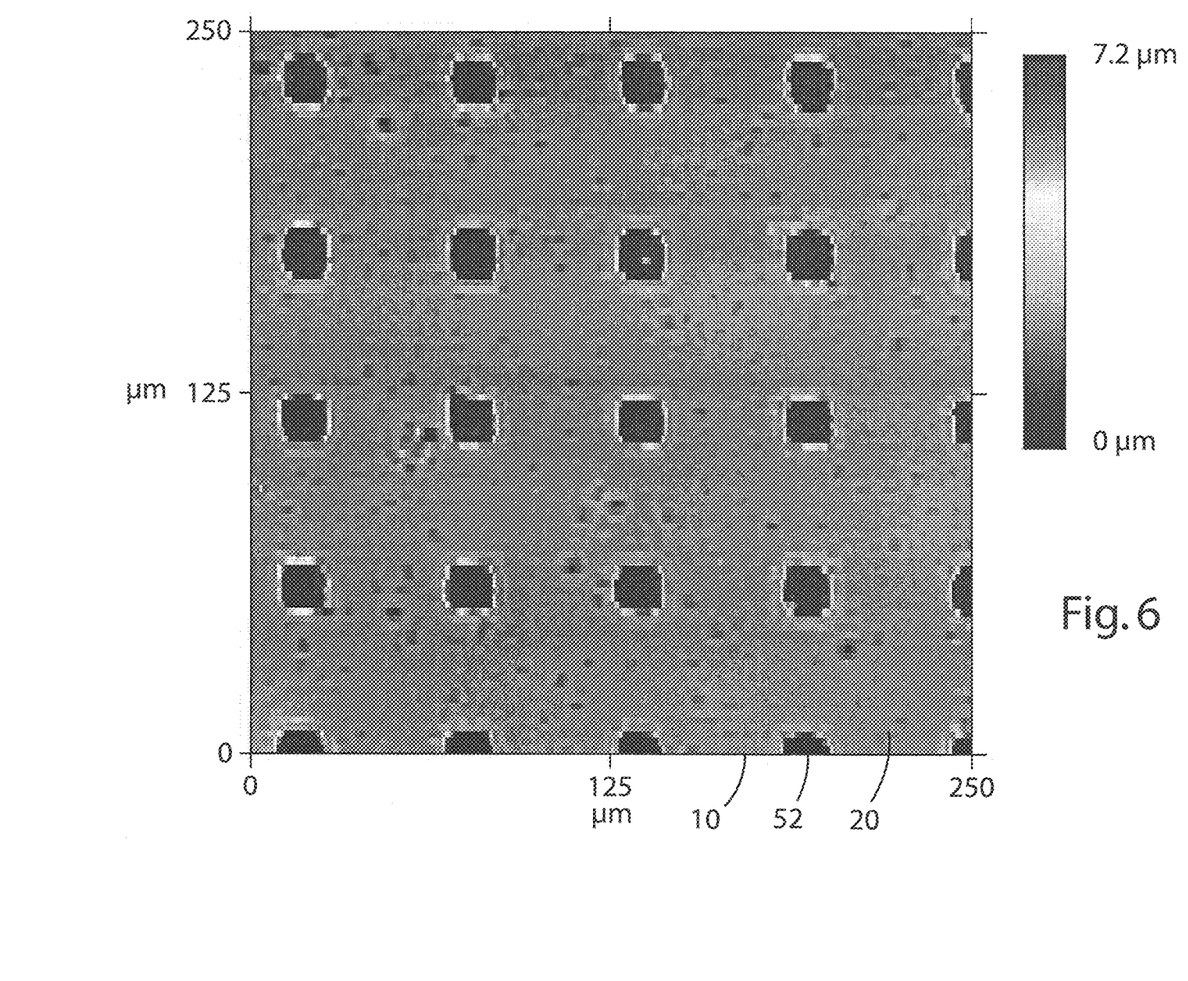
FIG. 6 is a plan view of the flexible template of FIG. 5.

As discussed above, a master part 38 (FIGS. 3 and 4) having a master surface 40 is fabricated utilizing a suitable known micro-fabrication technique. A template 10 (FIGS. 5 and 6) is then formed from a PDMS or other suitable elastomeric precursor. In the illustrated example, liquid PDMS material is poured onto the master surface 40 of master part 38, and the material is then cured. The template 10 is then peeled away from the master part 38. As shown in FIGS. 5 and 6, the template 10 includes features that are the inverse of the master surface 40 and the surface 22 of the part 24. In the illustrated example, the openings or cavities 52 formed in template 10 have an opening size "D" that is substantially similar to the dimension "D" (FIG. 3) of the protrusions 42. Similarly, the openings 52 may have a depth that is substantially the same as the height "H" of protrusions 42. As discussed above, the protrusions 42 of master part 38 have a generally square cross-sectional shape. The openings or cavities 52 of template 10 also have a generally square cross-sectional shape. However, because the PDMS material of template 10 does not exactly match the geometry of surface 40 of master part 38, the openings or cavities 52 may have a shape that is somewhat rounded relative to the square cross-sectional shape of the protrusions 42. It will be understood that the protrusions may have virtually any cross-sectional shape, height, spacing, and other geometric features as required to provide the desired surface characteristics.

As discussed above, the template 10 is positioned on a tool surface 14 with surface 20 of template 10 facing upwardly. The layers 26A-26D of prepreg carbon fiber composite material are then positioned on surface 20 of template 10, and the uncured layers 26 are positioned in an autoclave 30 or other suitable device.

As known in the art, the layers 26 may be heated to lower the viscosity of the thermosetting polymer matrix material of the prepreg layers 26. As pressure is applied to surface 56 (FIGS. 1 and 2) of an outer layer 26D, the matrix material flows into the openings or cavities 52 of template 10. As the temperature is increased, the matrix material cures, thereby forming a surface 22 (FIGS. 7 and 8) having a plurality of protrusions 54 or other such features. The amount of pressure applied to surface 56 and the temperatures utilized in the autoclave 30 will vary as required for a particular application.

If the layers 26A-26D comprise prepreg carbon fiber, thermosetting polymer matrix material of layers 26 may have sufficiently low viscosity to flow into openings or cavities 52 at a temperature in the range of about 65° F. to about 700° F., more specifically from about 65° F. to about 350° F., and even more specifically from about 150° F. to about 300° F. In some embodiments the thermosetting polymer matrix flows at a temperature of about 150° F. The matrix material may cure/soldify, for example, at temperatures of about 200° F. to about 400° F., more specifically at temperatures of about 250° F. to about 350° F., even more specifically at temperatures of about 300° F. to about 350° F. In some embodiments the thermosetting polymer matrix cures/solidifies at a temperature of about 350° F.

In general, pressures in the range of about 100 psi to about 200 psi may be applied to surface 56 to cause the thermosetting polymer matrix material to flow into the cavities or openings 52 of template 10. The temperature within the autoclave 30 may be held at a flow temperature (e.g. about 65° F. to about 700° F.) for a period of time at an elevated pressure (e.g. about 100 to about 200 psi) for a period of time (e.g. about 30 to about 60 minutes) to ensure that the matrix material flows into cavities 52. The temperature can then be raised to a cure temperature (e.g. about 200° F. to about 400° F.). Alternatively, the temperature within the curing device and/or the pressure/temperature vessel, such as the autoclave 30, may be gradually increased at a relatively slow rate. For example, the temperature can be gradually increased at a rate of about 2° C. per minute to about 10° C. per minute (about 3° F. per minute to about 18° F. per minute), specifically at a rate of about 5° C. per minute to about 10° C. per minute (about 9° F. per minute to about 18° F. per minute) while pressure is applied to the surface 56 to thereby ensure that the polymer matrix material is in a flowable state for a period of time that is sufficient to permit the matrix material to flow into the apertures or openings 52 of template 10.

Because the template 10 is made from a relatively thin layer of elastomeric material, the template 10 curves and conforms to curved portions 16 and 18 (FIG. 1) of mold surface 14. This enables forming of parts 24 having a curved outer profile 8. The outer profile 8 may comprise an aerodynamic surface of an aircraft fuselage, wing, or other structure.

After the part 24 is cured, the part 24 is released from the mold 12, and the template 10 is peeled from the surface 22 of part 12 to reveal the freestanding micro-structures (e.g. protrusions 54) which are substantially a replica of the master pattern (e.g. master surface 40). If templates 10 are formed from a PDMS material, the templates typically have a low stick surface that permits removal of templates 10 from surface 22. However, a mold release agent may be utilized if required.

In general, the templates 10 can be re-used indefinitely. Before loading the template 10 into a mold 12 the template 10 is inspected for damage and/or debris. Debris is removed from the template 10 with a solvent rinse to the extent possible. Although damaged templates 10 cannot normally be repaired, a new copy of the master pattern or part 38 can be made.

As discussed above, the surface topography of part surface 22 may vary as required for a particular application. Accordingly, it will be understood that the protrusions 54 are merely an example of one possible surface topography. In general, the surface 22 may include a wide range of micro-structures or features as required to produce a desired surface characteristic. Also, in the example described above, the part 24 comprises a composite part made from layers 26 of prepreg carbon fiber material. However, it will be understood that other materials and processes may also be utilized according to other aspects of the present invention. For example, the part 24 may be fabricated from a polymer material that does not include a fiber reinforcement. Still further, the part 24 may be fabricated from materials other than thermosetting polymers. For example, the part 24 may be formed from a thermoplastic polymer material. In this case, a sheet of thermoplastic material may be positioned on a mold surface 14, and the material may be heated to lower the viscosity of the thermoplastic polymer. Pressure may then be applied to the polymer material to thereby cause the surface of the material to form a surface that substantially conforms to the surface of template 10.

Figure 9:
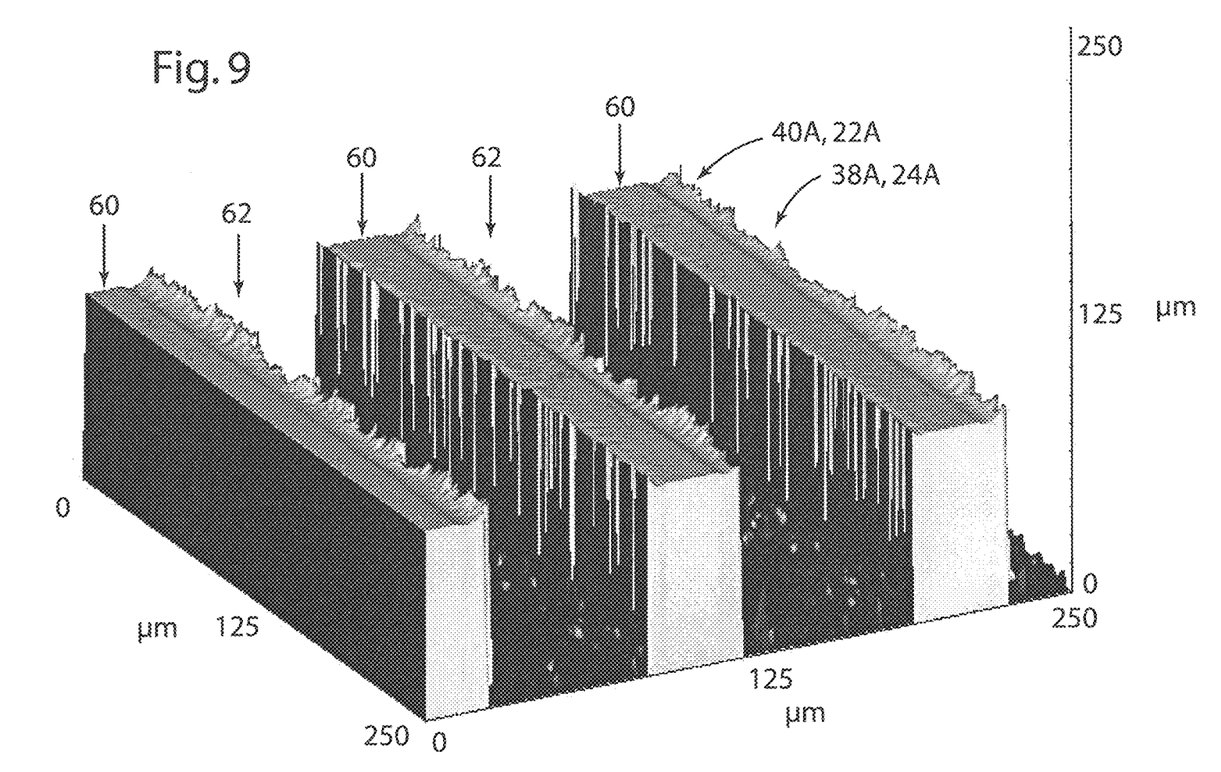
FIG. 9 is an isometric view of a surface topography according to another aspect of the present invention.
Figure 10:
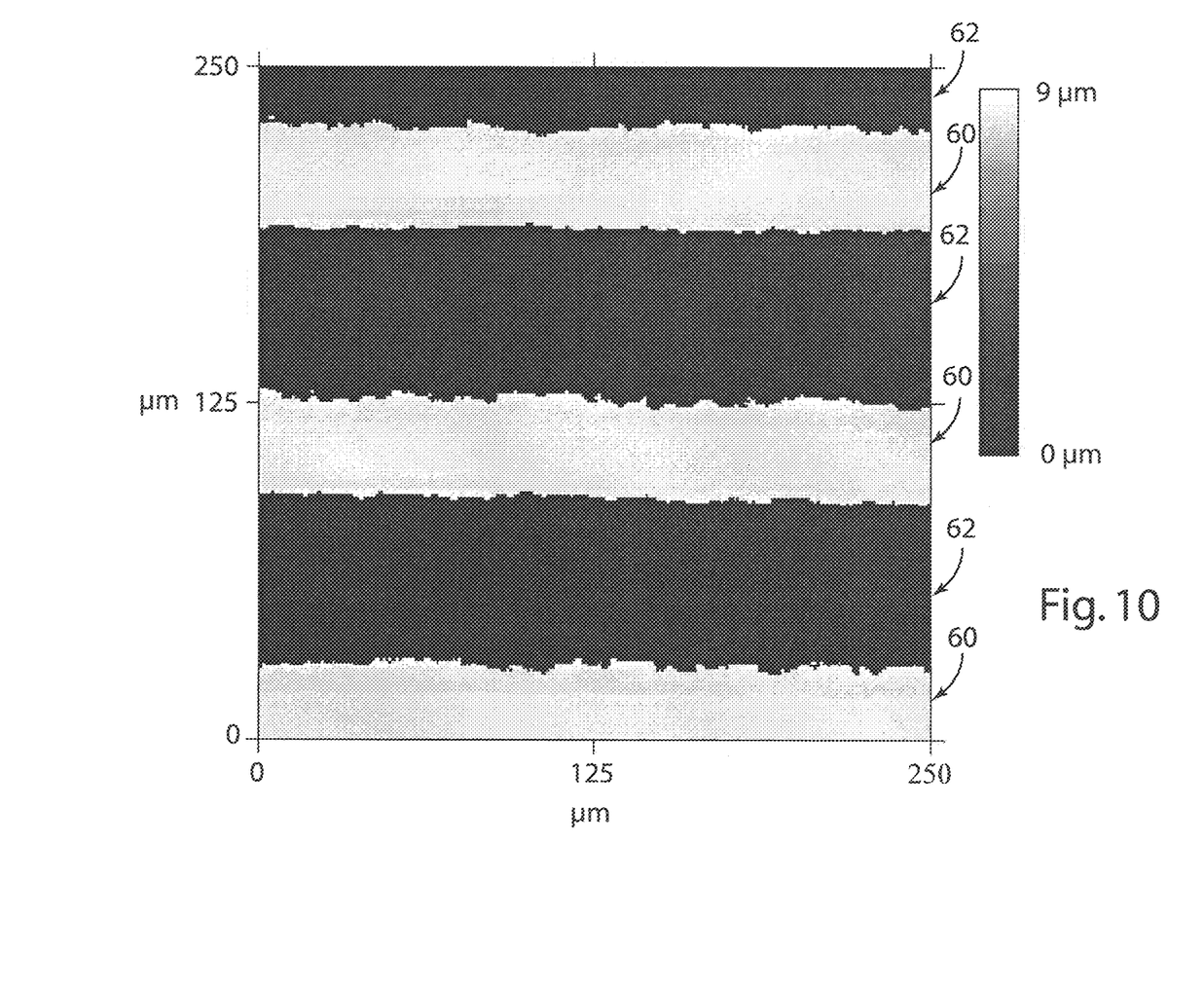
FIG. 10 is a plan view of the surface topography of FIG. 9.

With further reference to FIGS. 9 and 10, a master part 38A according to another aspect of the present invention includes a master surface 40 comprising a plurality of raised ridges 60 forming channels 62 therebetween. In this example, master part 38A comprises an epoxy-based SU-8 photoresist. The master part 38A can be utilized to form a part 24A having a surface 22A that is substantially identical to the master surface 40A. The master surface 40A may be formed in a suitable material utilizing a standard microfabrication technique such as laser writing or electron beam writing, and a template 10 may be formed from PDMS or the like utilizing the master surface 40A. A template 10 formed utilizing master surface 40A will generally have a surface (not shown) that is an inverse of the micro-structures shown in FIGS. 9 and 10. A template 10 can then be utilized to form a part 22A having surface 24A as described in more detail above in connection with FIGS. 1 and 2.

The ridges 60 and channels 62 of FIGS. 9 and 10 may have tapered surfaces to form a dovetail structure. In this case, a master template having a plurality of channels 62 in the form of dovetails is formed. A template 10 is then formed from PDMS or other suitable material, and utilized in a molding process to form a part having a dovetail surface. A pair of parts having interlocking dovetail surfaces can be formed in this way to provide a mechanical bond between the parts to hold the joint together in the event that a chemical bond is too weak (e.g. due to contamination or corrosion in the joint).

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "some embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A method of forming an outer surface of an aerodynamic or hydrodynamic structure including an object surface of a composite object, the method comprising;
    forming a flexible template having a template surface comprising a plurality of surface features that are inverses of micro-structures to be formed on a surface of a composite material, wherein the flexible template comprises a plurality of casted pieces, and wherein dimensions of respective micro-structures are in a range up to about 100 microns;
    positioning the plurality of casted pieces of the flexible template in a mold tool having curved surfaces such that the plurality of pieces engage concave and convex portions of the curved surfaces of the mold tool and are directly adjacent to one another, the plurality of casted pieces are un-affixed to the mold tool, and the template surface faces away from the curved surfaces;

flexing the plurality of casted pieces of the flexible template to conform to the curved surfaces of the mold tool;

covering at least a portion of the template surface with one or more layers of the composite material after flexing the flexible template such that the flexible template separates the composite material from the curved surfaces, wherein the composite material comprises a matrix material having a flowable state and fiber reinforcement;

positioning an impermeable envelope over the one or more layers of the composite material and the flexible template and subjecting the layers to a vacuum pressure;

heating the one or more layers of the composite material to a flow temperature and applying pressure to the one or more layers of the composite material to cause at least some of the matrix material to flow into the surface features of the template surface;

solidifying the matrix material to form the composite object having the object surface with defined micro-structures comprising protrusions that are inverses of the surface features of the template surface;

removing the composite object and the flexible template from the mold tool together; and peeling the flexible template from the composite object to expose the object surface after removing the composite object and the flexible template from the mold tool together.

2. The method of claim 1, wherein:
at least some of the surface features of the template surface comprise cavities or openings.

3. The method of claim 2, wherein:
the protrusions are sized and positioned relative to one another in a manner that tends to reduce a contact area of fluids that are brought into contact with the object surface.

4. The method of claim 3, wherein:
the protrusions on the object surface form a superhydrophobic surface whereby fluids are suspended over air trapped between the protrusions when a fluid comes into contact with the object surface.

5. The method of claim 2, wherein:
the protrusions are generally columnar in shape.

6. The method of claim 2, wherein:
the protrusions have an aspect ratio of about 1.0 to about 10.0.

7. The method of claim 6, wherein:
the protrusions are spaced apart from each other about 1.0 microns to about 100 microns.

8. The method of claim 6, wherein:
the protrusions have a variable cross sectional area.

9. The method of claim 2, wherein:
the protrusions are spaced apart in rows to form a grid.

10. The method of claim 1, including:
forming a planar master pattern defining micro-structures on a surface of the master pattern;
forming the template by casting an elastomeric material onto the master pattern.

11. The method of claim 10, wherein:
pressure is applied to the composite material in a curing device or a pressure and/or temperature vessel.

12. The method of claim 1, wherein:
the object surface comprises an aerodynamic surface that is, in use, exposed to airflow, and wherein the micro-structures of the object surface are configured to reduce aerodynamic or hydrodynamic drag and/or reduce adhesion of foreign matter.

13. The method of claim 1, wherein:
at least some of the micro-structures of the object surface are configured to improve bond strength of an adhesive joint and define an average surface roughness in a range of about 100 nanometers to about 100 microns; and including:
providing a second component;
adhesively bonding the composite object to the second component by bringing at least a portion of the object surface and the second component into contact with an adhesive material;
wherein at least some of the micro-structures of the composite object surface are ridges and channels having tapered surfaces to provide a composite object dovetail structure, and where the second component has correspondingly shaped dovetail surfaces configured to interlock with the composite object dovetail structure, and wherein the corresponding dovetail surfaces on the composite object and the second component are brought into contact.

14. A method of forming an outer surface of an aerodynamic or hydrodynamic structure including an object surface having a plurality of micro-structures, the method comprising:
forming a flexible template having a plurality of microscopic cavities or openings, the flexible template comprising a plurality of casted pieces;
deforming the flexible template by positioning the flexible template in contact with a non-planar surface such that the plurality of casted pieces engage portions of curved surfaces of a mold tool and are directly adjacent to one another, the plurality of casted pieces are un-affixed to the non-planar surface, and the cavities or openings face away from the non-planar surface;
subjecting a material and the flexible template to a vacuum and heating the material to a flow temperature to cause it to flow into at least a portion of the cavities or openings while the flexible template is in contact with the non-planar surface, wherein the flexible template separates the material from the non-planer surface;
removing the material and the flexible template from the non-planar surface together;
disengaging the material from the template to form the object surface having the plurality of micro-structures including protrusions formed by the cavities or openings after removing the material and the flexible template from the non-planar surface together, wherein dimensions of respective micro-structures are in a range up to about 100 microns; and
wherein at least some of the micro-structures of the object surface are elongated ridges and elongated channels having tapered surfaces to provide a composite object dovetail structure and are configured to provide a mechanical bond of an adhesive joint.

15. The method of claim 14, including:
applying pressure to the material to cause the material to flow into at least a portion of the cavities or openings.

16. The method of claim 15, wherein:
the material is in a flowable state at a time that it flows into at least a portion of the cavities or openings; and including:
causing the material to cure prior to disengaging the material from the template.

17. The method of claim 16, wherein;
the material comprises a polymer material forming a matrix of a fiber reinforced composite material; and wherein:
the material is cured utilizing heat.

18. The method of claim 14, including:
forming a planar master surface having a plurality of protrusions; and wherein:
the flexible template is formed from an elastomeric material that is brought into contact with the planar master surface in a flowable form and cured.

19. The method of claim 14, wherein:
the non-planar surface comprises a curved mold surface.

20. A method of forming an outer surface of an aerodynamic or hydrodynamic structure including a surface of a composite material having a curable matrix and fiber reinforcement, the method comprising;
providing a generally planar master part having a generally planar master surface including a plurality of micro-structures, wherein dimensions of respective micro-structures are in a range up to about 100 microns;
forming a generally planar flexible casted template piece by pouring uncured liquid template material onto the generally planar master surface;
curing the liquid template material to form a template surface comprising a plurality of surface features that are inverses of micro-structures to be formed on the surface of the composite material;
removing the generally planar flexible casted template piece from the generally planar master surface;
causing, after removal from the master surface, the flexible casted template piece to flex into a non-planar shape by positioning the flexible casted template piece in a mold tool having curved surfaces, thereby flexing the flexible casted template piece so that it is non-planar and conforms to the curved surfaces of the mold tool, wherein the flexible casted template piece is positioned in the mold tool such that the template surface faces away from the curved surfaces, the flexible casted template piece is directly adjacent to at least one other flexible casted template piece in the mold tool, and the flexible casted template piece and the at least one other flexible casted template piece each engage portions of the curved surfaces of the mold tool and are un-affixed to the mold tool;
covering at least a portion of the template surface with the composite material such that the flexible casted template piece separates the composite material from the curved surfaces, wherein the composite material comprises a first material having a flowable state and fiber reinforcement;
heating the first material to a flow temperature and applying pressure to the composite material to cause at least some of the first material to flow into the surface features of the template surface;
solidifying the first material to form a composite object having an object surface with defined micro-structures that are inverses of the surface features of the template surface; and
removing the composite object, the flexible casted template piece, and the at least one other flexible casted template piece from the mold tool together;
separating the flexible casted template piece and the at least one other flexible casted template piece from the composite object after the flexible template piece, the at least one other flexible casted template piece, and the composite object have been removed from the mold tool together.

* * * * *